US007983706B2

(12) United States Patent
Wolter

(10) Patent No.: US 7,983,706 B2
(45) Date of Patent: Jul. 19, 2011

(54) SYSTEM AND METHOD FOR VOICE AND TEXT BASED SERVICE INTERWORKING

(75) Inventor: David Randall Wolter, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 765 days.

(21) Appl. No.: 10/935,731

(22) Filed: Sep. 7, 2004

(65) Prior Publication Data
US 2006/0052127 A1 Mar. 9, 2006

(51) Int. Cl.
*H04B 7/00* (2006.01)
(52) U.S. Cl. ......... 455/519; 455/517; 455/518; 455/566
(58) Field of Classification Search .......... 455/516–521, 455/526, 4, 66, 414.4
See application file for complete search history.

(56) References Cited

U.S. PATENT DOCUMENTS

| | | | |
|---|---|---|---|
| 6,426,956 B1 * | 7/2002 | Eteminan | 370/401 |
| 6,751,468 B1 | 6/2004 | Heubel et al. | |
| 6,763,226 B1 * | 7/2004 | McZeal, Jr. | 455/90.2 |
| 6,941,345 B1 * | 9/2005 | Kapil et al. | 709/206 |
| 2002/0077082 A1 | 6/2002 | Cruickshank | |
| 2004/0152477 A1 * | 8/2004 | Wu et al. | 455/466 |
| 2004/0196826 A1 | 10/2004 | Bao et al. | |
| 2004/0202117 A1 * | 10/2004 | Wilson et al. | 370/310 |
| 2004/0203942 A1 | 10/2004 | Dehlin | |
| 2004/0219925 A1 * | 11/2004 | Ahya et al. | 455/450 |
| 2004/0224710 A1 | 11/2004 | Koskelainen et al. | |
| 2004/0266418 A1 * | 12/2004 | Kotzin | 455/420 |
| 2004/0267531 A1 | 12/2004 | Whynot et al. | |
| 2005/0113122 A1 * | 5/2005 | Korneluk | 455/518 |
| 2005/0136952 A1 * | 6/2005 | Zabawskyj et al. | 455/466 |
| 2005/0202836 A1 * | 9/2005 | Schaedler et al. | 455/466 |
| 2005/0245240 A1 * | 11/2005 | Balasuriya et al. | 455/414.1 |
| 2005/0250476 A1 * | 11/2005 | Worger et al. | 455/412.1 |
| 2006/0029273 A1 * | 2/2006 | Lipscher et al. | 382/156 |
| 2006/0030347 A1 * | 2/2006 | Biswaas | 455/518 |
| 2006/0047511 A1 * | 3/2006 | Hussain | 704/235 |

OTHER PUBLICATIONS

International Search Report for Internation Application No. PCT/US 05/29888, Mailed on Mar. 15, 2006.
Written Opinion of the International Searching Authority for PCT/US 05/29888, Mailed on Mar. 15, 2006.

* cited by examiner

*Primary Examiner* — Edward Urban
*Assistant Examiner* — Fayyaz Alam
(74) *Attorney, Agent, or Firm* — Toler Law Group

(57) ABSTRACT

A method of communication includes receiving a request to initiate a push-to-talk/instant messaging exchange from a push-to-talk device. A determination is made in order to ascertain if an instant messaging device is available to partake in the push-to-talk/instant messaging exchange. If the instant messaging device is available, the push-to-talk device is notified that the push-to-talk/instant messaging exchange has begun. Voice packets are received from the push-to-talk device after a push to talk button is pressed and released. The voice packets from the push-to-talk device are converted to text packets. Then, the converted text packets are transmitted to the instant messaging device. The method further includes determining whether the push-to-talk device is blocked by the instant messaging device. If the push-to-talk device is not blocked, text packets are received from the instant messaging device and converted to voice packets. Further, the converted voice packets are transmitted to the push-to-talk device.

33 Claims, 2 Drawing Sheets

SYSTEM AND METHOD FOR VOICE AND TEXT BASED SERVICE INTERWORKING

FIELD OF THE DISCLOSURE

The present disclosure relates generally to push-to-talk services and instant messaging services.

BACKGROUND

Push-to-talk (PTT) service has become a very popular wireless service. PTT provides walkie-talkie type functionality over a cellular system by encoding a user's voice packets and transmitting them to another device using voice-over-internet protocol (VoIP). Typically, the voice packets are sent to a server, which forwards the voice packets to a destination device where they are converted back to audio voice. A popular communication service includes instant messaging (IM) and chat. These communication services allow the exchange of text-based messages between users and groups of users over a distributed Internet protocol (IP) network.

Currently, PTT services do not interact with IM and chat services. However, there are certain instances in which it would be beneficial to allow PTT devices to communicate with IM devices. For example, it would be very difficult to effectively type and carry on an IM or chat session while driving.

Accordingly, there is a need for an improved system and method for voice and text based service interworking.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
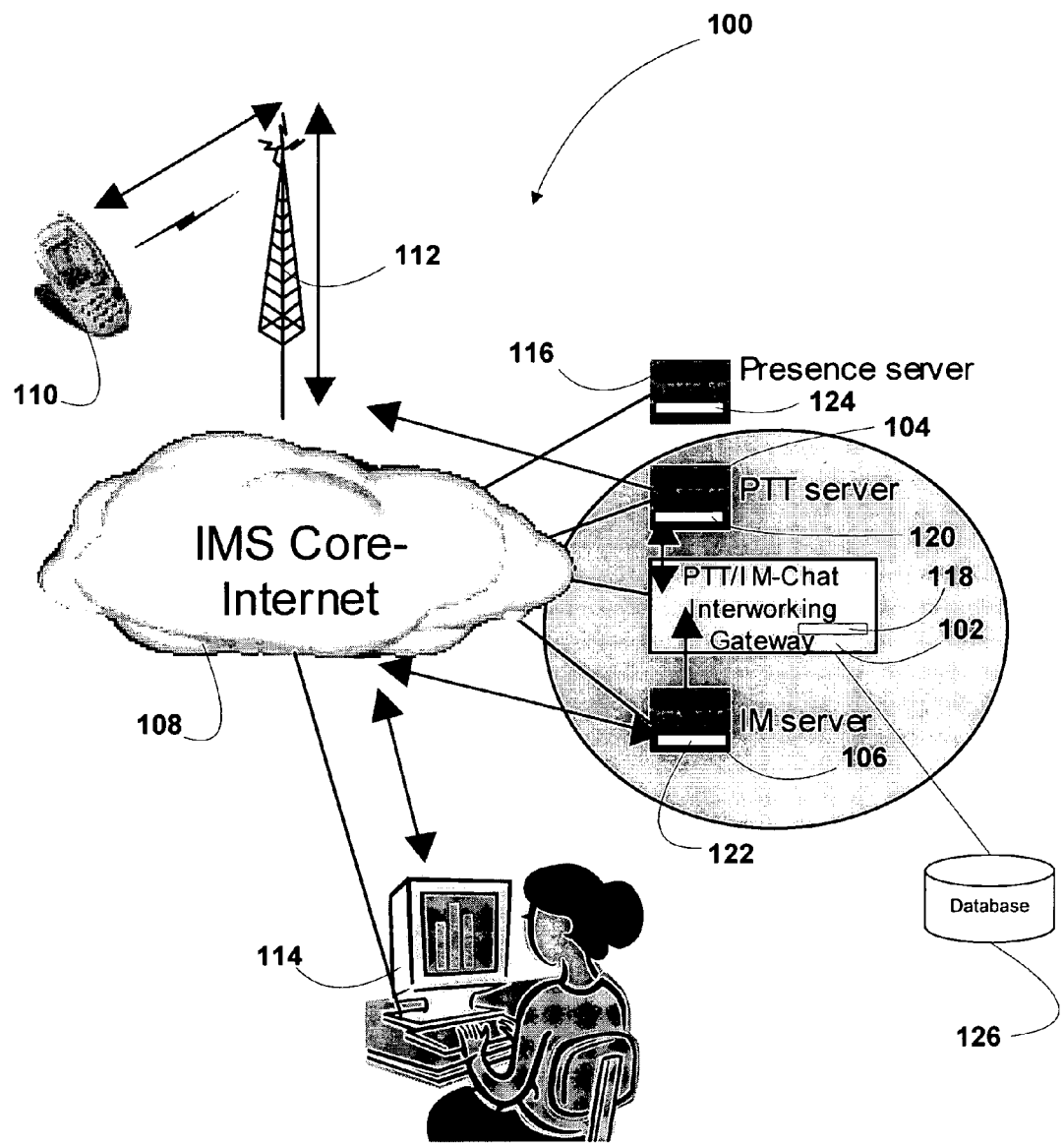
FIG. 1 is a block diagram of a push-to-talk/instant messaging system.

A method of communication includes receiving a request to initiate a push-to-talk/instant messaging exchange from a push-to-talk device. The request to initiate may be the result of determining the target user's availability and device type through one or more presence services. Then, a determination is made in order to ascertain if an instant messaging device is available to partake in the push-to-talk/instant messaging exchange. After determining that the instant messaging device is available, the push-to-talk device is notified that the push-to-talk/instant messaging exchange has begun. Voice packets are received from the push-to-talk device after a push to talk button is pressed and released. The voice packets from the push-to-talk device are converted to text packets. Then, the converted text packets are transmitted to the instant messaging device.

In a particular embodiment, the method further includes determining whether the push-to-talk device is blocked by the instant messaging device. If not, text packets are received from the instant messaging device. The text packets from the instant messaging device are converted to voice packets. Further, the converted voice packets are transmitted to the push-to-talk device.

In an illustrative embodiment, multimedia content is received from the push to talk device. The multimedia content can be transmitted to the instant messaging device. Alternatively, the multimedia content can be stored at a database. In such a case, a link to the multimedia content is transmitted to the instant messaging device and the multimedia content can be communicated from the database to the instant messaging device.

In another embodiment, a method of communication is provided and includes receiving a request to initiate a push-to-talk/instant messaging exchange from an instant messaging device. Moreover, the method includes determining if a push-to-talk device is available to partake in the push-to-talk/instant messaging exchange. After determining that the push-to-talk device is available, the instant messaging device is notified that the push-to-talk/instant messaging exchange has begun.

In yet another embodiment, a communication system includes a data network and a push-to-talk/instant messaging server that is in communication with the data network. The push-to-talk/instant messaging server includes a computer readable medium and a computer program embedded within the computer readable medium for facilitating a push-to-talk/instant messaging exchange between the push-to-talk device and the instant messaging device.

In still another embodiment, a computer system for facilitating communication between a push-to-talk device and an instant messaging device is provided. In an illustrative embodiment, the computer server comprises a push-to-talk server, an instant messaging server, and a push-to-talk/instant messaging gateway server. The push-to-talk/instant messaging gateway server includes instructions to receive voice packets from the push-to-talk server and instructions to convert the voice packets to text packets. Further, the push-to-talk/instant messaging gateway server includes instructions to transmit the text packets to the instant messaging server. The reverse is also true, where text packets are received from the IM server and are converted to voice packets, which are then forwarded to the PTT server.

Referring to FIG. 1, a push-to-talk/instant messaging (PTT/IM) system is shown and is generally designated 100. As shown in FIG. 1, the PTT/IM system 100 includes a PTT/IM-Chat interworking gateway application server 102 that is connected to a PTT server 104 and to an IM server 106. In a particular embodiment, the PTT server 104 and the IM server 106 can be incorporated into the PTT/IM-chat Interworking gateway application server 102. In another embodiment, these PTT server 104 and the IM server 106 do not have to belong to the same network or service provider. For example, the PTT server 104 and the IM server 106 may belong to separate networks and can include interconnection and interworking agreements.

As illustrated in FIG. 1, the PTT/IM-chat interworking gateway application server 102 is connected to a network connection, e.g., the Internet 108. A PTT device 110, e.g., a cellular telephone with PTT capability, is connected to the Internet 108 via a wireless transceiver 112 or a wireless fidelity (Wi-Fi) connection, e.g., an IEEE 802.11 connection. In an illustrative embodiment, the PPT device 110 can include a radio transceiver and a PTT button that can be pressed by the user to initiate PTT communication either to another PTT device or to initiate PTT/IM communication with an IM device. In an alternative embodiment, the PTT/IM communication can be initiated by toggling a soft button presented by a user interface displayed at the PTT device 110. Further, the PTT device 110 can include a built-in digital camera and can be used to send multimedia content to another device when the PTT button is pressed and released.

FIG. 1 further shows that an IM device 114, e.g., a desktop computer, a laptop computer, a portable digital assistant (PDA), a cellular phone, etc., can also be connected to the Internet 108 via a wireless or wireline modem or broadband data connection, such as a digital subscriber loop (DSL). Further, the IM device 114 can be connected to the Internet via an IEEE 802.11 connection or other short-range wireless connection. As shown, the PTT device 110 can communicate with the PTT/IM-chat interworking gateway 102 via the Internet 108 and the PTT server 104. Further, the IM device 114 can communicate with the PTT/IM-chat interworking gateway 102 via the Internet 108 and the IM server 106.

In a particular embodiment, the PTT device 110, e.g., a mobile voice-handling device, can communicate with an IM device 114, e.g., a text device, using the logic described below. As shown, the system 100 can also include a presence server 116 that can be used to determine whether the PTT device 110 or the IM device 114 is available for a PTT/IM exchange when requested by either device 110, 114. The presence information provided by the presence server 116 may also be used by the PTT/IM-chat interworking gateway application server 102 in order to enable, or otherwise, enhance its operation.

FIG. 1 further indicates that each server 102, 104, 106, 116 can include a respective computer readable medium 118, 120, 122, 124. In a particular embodiment, any or all of the logic steps required to facilitate a PTT/IM session, or exchange, between the PTT device 110 and the IM device 114 can be embedded within the computer readable medium 118, 120, 122, 124 of each server 102, 104, 106, 116. As shown in FIG. 1, the system 100 can further include a database 126 connected to the PTT/IM-chat interworking gateway application server 102. During a PTT/IM exchange a user can upload multimedia content, e.g., a digital picture taken by the PTT device 110, a digital movie recorded by the PTT device 110, or a digital sound clip recorded by the PTT device 110, to the database 126, and then, send a link to a target device, e.g., the IM device 114, as part of a PTT/IM message indicating the multimedia content of interest has been uploaded to the database. The link would indicate to the target device where the multimedia content is located. Thus, a user with a target device could view the multimedia content without having to download the multimedia content to the target device. The multimedia content can be in joint photographic experts group (JPEG) format, moving pictures expert group (MPEG format), tagged image file format (TIFF), graphics interchange format (GIF), portable data file (PDF) format, bitmap format, WAV format, audio video interleave (AVI) format, etc.

Figure 2:
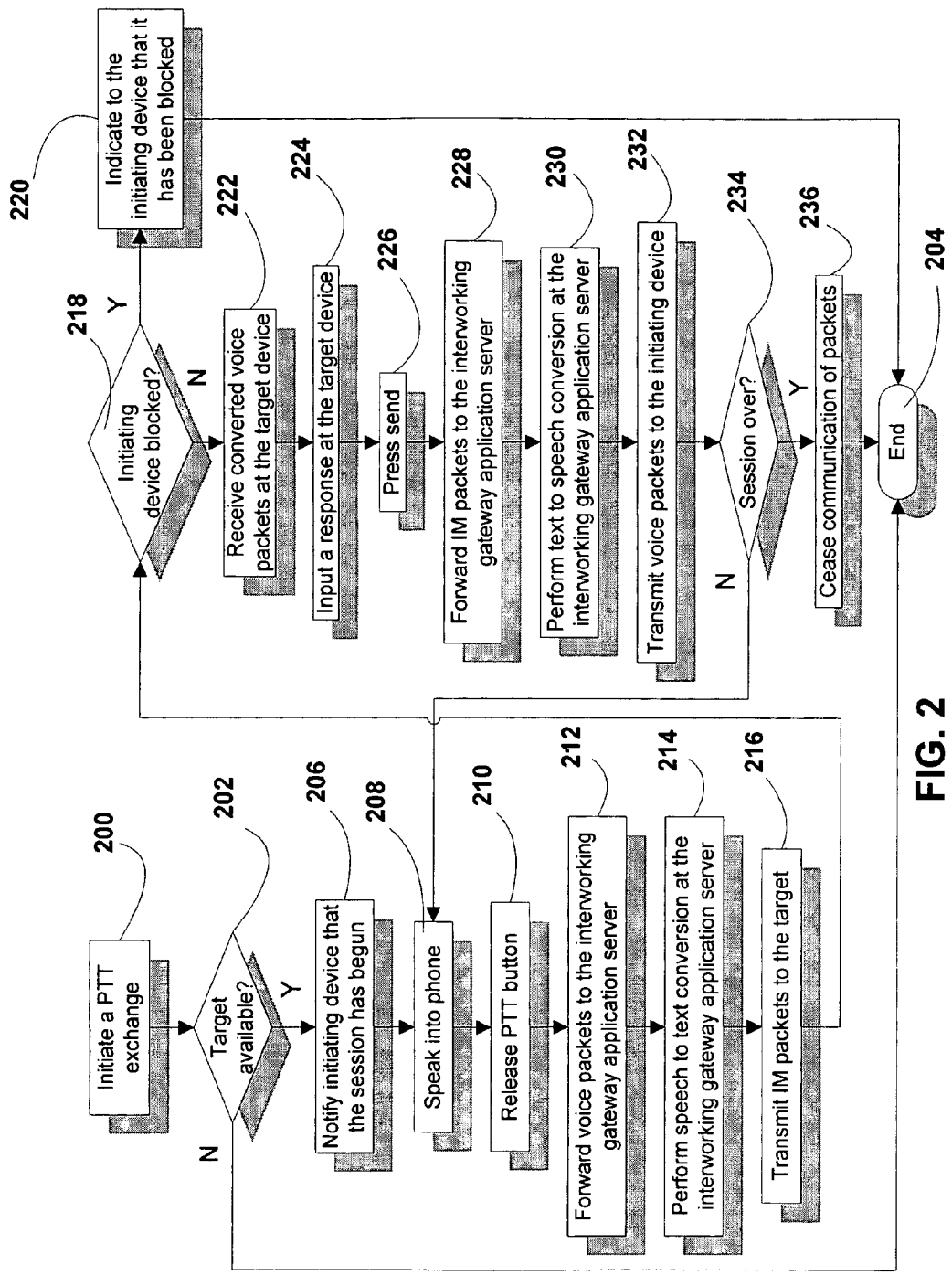
FIG. 2 is a flow chart to illustrate an embodiment of logic for facilitating push-to-talk/instant messaging communication.

Referring to FIG. 2, a method for facilitating communication between a PTT device and an IM device is shown and commences at block 200 when a PTT/IM exchange is initiated, e.g., by the PTT device 110 (FIG. 1). In a particular embodiment, the initiation of the PTT/IM exchange occurs through the servers. In other words, the PTT device 110 (FIG. 1) can contact the PTT server 104 (FIG. 1), which can contact the PTT/IM-chat interworking gateway application server 102 (FIG. 1). The PTT/IM-chat interworking gateway application server 102 (FIG. 1), in turn, can contact the IM server 106 (FIG. 1) and the IM server 106 (FIG. 1) can contact the IM device 114 (FIG. 1). In a particular embodiment, the IM device (FIG. 1) need not be notified that the device that initiated the PTT/IM exchange is a PTT device 110 (FIG. 1). The IM server 106 (FIG. 1) can simply indicate to the IM device (FIG. 1) that someone is would like to initiate an IM session.

In an illustrative embodiment, the PTT/IM exchange can be initiated by selecting a target user from a buddy list that can show a list of available target users. The availability of the target user can be determined using presence services provided by the presence server 116 (FIG. 1). In an illustrative embodiment, the presence server 116 (FIG. 1) can indicate that a target user is available and whether the target user is available via a PTT device 100 (FIG. 1) or an IM device 114 (FIG. 1). Otherwise, the presence server 116 (FIG. 1) can simply indicate that the target user is available, but not indicate how the target user is available. Also, in the case that a target user possesses both types of devices, the presence server can include an indication of a user preference for communicating with one device or the other.

At step 202, a decision is made in order to determine whether a target user is available. In a particular embodiment, it can be determined whether the target user is available via the same mode of communication as the initiating device, e.g., voice-to-voice for PTT-to-PTT communication or text-to-text for IM-to-IM communication. If the target user is not available at all, or the target user is available via the same mode of communication, the logic ends at state 204. After the logic ends, the exchange between the devices can be undertaken via the normal mode of communication, e.g., text-to-text for IM, or voice-to-voice for PTT.

Conversely, at decision step 202, if the target user is available via a different mode of communication, e.g., text for IM, the logic continues to block 206 and the initiating device, e.g., the PTT device 110 (FIG. 1), is notified that a PTT/IM session has begun. At block 208, a user speaks into the PTT device 110 (FIG. 1) while holding a PTT button at the device. Thereafter, at block 210, the PTT button at the PTT device 110 (FIG. 1) is released.

Moving to block 212, voice packets from the PTT device 110 (FIG. 1) are forwarded to the PTT/IM-chat interworking gateway application server 102 (FIG. 1), e.g., directly or via the PTT server 104 (FIG. 1). At block 214, speech-to-text conversion is performed at the PTT/IM-chat interworking gateway application server 102 (FIG. 1) in order to transform the voice packets to IM packets, i.e., text packets. Next, at block 216, the transformed text IM packets are transmitted to the IM device 114 (FIG. 1), e.g., directly or via the IM server 106 (FIG. 1). Continuing to step 218, a determination is made in order to ascertain whether the initiating device, e.g., the PTT device 110 (FIG. 1), is blocked by the target device, e.g., the IM device 114 (FIG. 1). In a particular embodiment, if the PTT/IM session, or exchange, is initiated by the IM device, the determination is made to determine if the IM device (114) is blocked by the PTT device 110 (FIG. 1). Further, this determination can be made earlier in the logic in order to not waste bandwidth and communication overhead. If the initiating device is blocked, the logic proceeds to block 220 and the PTT/IM-chat interworking gateway application server 102 (FIG. 1) indicates to the initiating device that it has been blocked by the target device. The logic then ends at state 204.

On the other hand, if the initiating device is not blocked, the logic continues to block 222 and the converted voice packets are received at the target device, e.g., the IM device 114 (FIG. 1). At block 224, a text response is input to the target device. In a particular embodiment, the text response can be input to the target device by using a keyboard. Then, a send button, or a return button, is pressed at block 226. Thereafter, at block 228, the IM packets are forwarded to the PTT/IM-chat interworking gateway application server 102 (FIG. 1) from the IM device 114 (FIG. 1). Proceeding to block 230, text-to-speech conversion is performed at the PTT/IM-chat interworking gateway application server 102 (FIG. 1) in order to convert the text response from the IM device 114 into voice packets that can be received by the PTT device 110 (FIG. 1). At block 232, the voice packets are transmitted to the device that initiated the PTT/IM session, i.e., the PTT device 110, e.g., directly or via the PTT server 104 (FIG. 1).

Moving to decision step 234, a decision is undertaken in order to determine if the PTT/IM session is over. If the PTT/IM session is over, the communication of data packets, e.g., voice packets and text packets, ceases at block 236 and the logic ends at state 204. However, if the PTT/IM session is not over, the logic returns to block 208 and continues as described above. In a particular embodiment, if the target user chooses not to respond to the initial contact by the initiating device, the logic simply ends.

In a particular embodiment, the PTT/IM communication is bi-directional. In other words, a user with a PTT device 110 (FIG. 1) can initiate contact with and communicate with another user having an IM device 114 (FIG. 1) and a user having an IM device 114 (FIG. 1) can initiate contact with and communicate with another user having a PTT device 110 (FIG. 1). Regardless of which device initiates the contact, the voice-to-text and text-to-voice conversions are performed within the PTT/IM-chat interworking gateway application server 102 (FIG. 1).

Moreover, in a particular embodiment, the PTT/IM-chat sessions can use multiple types of data bearers such as circuit switched, short message service (SMS), general packet radio service/enhanced data for global evolution (GPRS/EDGE), code division multiple access (CDMA) packet data, universal mobile telephone service (UMTS) packet data, etc. Further, the PTT/IM-chat interworking gateway application server can logically be integrated between an existing PTT server and an existing IM server or the gateway application server can be part of either the PTT server, the IM server, or both servers. Moreover, the PTT/IM-chat interworking gateway application server, the PTT server, and the IM server can be combined into one device, such as a server.

With the configuration of structure described above, the system and method for voice and text based service interworking allows communication to occur between PTT devices and IM devices. Thus, the functionality of each device is expanded. Specifically, a user with an IM device can contact one or more users with a PTT device and engage in a PTT/IM session. In the alternative, a user with a PTT device can contact one or more users with an IM device and engage in a PTT/IM session. Further, a user with an IM device or a PTT device can contact one or more users with a PTT device and one or more users with an IM device and the PTT/IM-chat interworking gateway application server 102 (FIG. 1) can determine the proper way to establish the individual sessions, e.g., IM-to-IM, PTT-to-PTT, IM-to-PTT, or PTT-to-IM. Accordingly, many more users and user devices can be included in a chat session regardless of whether they are using an IM device or a PTT device, or a mix of device and modality types.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of communication, comprising:
receiving a selection of a first target user selected by an initiating user having an initiating push-to-talk (PTT) device;
when the first target user is available to communicate via multiple devices including a target PTT device and a target instant messaging (IM) device, indicating a user preference of the first target user to communicate via a preferred device of the multiple devices;
beginning a PTT session with the initiating PTT device;
when the preferred device is the target IM device, beginning an IM session with the target IM device; and
when the preferred device is the target PTT device, beginning a PTT session with the target PTT device.

2. The method of claim 1, further comprising:
receiving voice packets from the initiating PTT device after a PTT button is pressed and released.

3. The method of claim 2, further comprising:
after beginning the IM session with the target IM device, converting the voice packets received from the initiating PTT device into converted text packets; and
transmitting the converted text packets to the target IM device.

4. The method of claim 3, further comprising:
determining whether the initiating PTT device is blocked by the target IM device.

5. The method of claim 3, further comprising:
receiving text packets from the target IM device; and
converting the text packets received from the target IM device into converted voice packets.

6. The method of claim 5, further comprising:
transmitting the converted voice packets to the initiating PTT device.

7. The method of claim 1, further comprising:
receiving multimedia content from the initiating PTT device; and
storing the multimedia content at a database.

8. The method of claim 7, further comprising:
transmitting a link associated with the multimedia content to the target IM device.

9. The method of claim 7, further comprising:
communicating the multimedia content from the database to the target IM device.

10. A method of communication, comprising:
receiving a request to initiate a messaging exchange with a target user from an initiating user having an initiating instant messaging (IM) device;
when the target user is available to communicate via multiple devices including a target push-to-talk (PTT) device and a target IM device, indicating a user preference of the target user to communicate via a preferred device of the multiple devices;
beginning an IM session with the initiating IM device;
when the preferred device is the target PTT device, beginning a PTT session with the target PTT device; and
when the preferred device is the target IM device, beginning an IM session with the target IM device.

11. The method of claim 10, further comprising:
receiving text packets from the initiating IM device.

12. The method of claim 11, further comprising:
after beginning the PTT session with the target PTT device, converting the text packets from the initiating IM device into converted voice packets.

13. The method of claim 12, further comprising:
transmitting the converted voice packets to the target PTT device.

14. The method of claim 13, further comprising:
determining whether the initiating IM device is blocked by the target PTT device.

15. The method of claim 14, further comprising:
receiving voice packets from the target PTT device.

16. The method of claim 15, further comprising:
converting the voice packets from the target PTT device into converted text packets.

17. The method of claim 16, further comprising:
transmitting the converted text packets to the initiating IM device.

18. A communication system, comprising:
a push-to-talk (PTT)/instant messaging (IM) server to communicate via a data network, the PTT/IM server including:
   a processor; and
   a computer-readable medium including processor-executable instructions that, when executed by the processor, cause the processor to:
      receive a selection of a target user from an initiating user device of a first device type;
      when the target user is available to communicate via multiple device types of devices, the multiple device types of devices including a target PTT device type and a target IM device type, indicate a user preference of the target user to communicate via a preferred device type of the multiple device types;
      prevent use of a PTT/IM exchange when the preferred device type is a same type of device as the first device type; and
      facilitate the PTT/IM exchange when the preferred device type is a different type of device than the first device type.

19. The system of claim 18, wherein the first device type is one of a PTT device type and an IM device type.

20. The system of claim 19, wherein the computer-readable medium further comprises:
instructions to receive voice packets from devices of the PTT device type.

21. The system of claim 20, wherein the computer-readable medium further comprises:
instructions to receive text packets from devices of the IM device type.

22. The system of claim 21, wherein the computer-readable medium further comprises:
instructions to convert voice packets to converted text packets to be delivered to one or more devices of the IM device type.

23. The system of claim 22, wherein the computer-readable medium further comprises:
instructions to convert text packets to converted voice packets to be delivered to one or more devices of the PTT device type.

24. A computer system for facilitating communication between a push-to-talk device and an instant messaging device, the computer system comprising:
a push-to-talk (PTT) server;
an instant messaging (IM) server;
a presence server to indicate that a target user is available to communicate and a user preference of the target user to communicate via one of a PTT device and an IM device; and
a PTT/IM gateway server comprising:
   a processor; and
   a computer-readable medium including processor-executable instructions that when executed by the processor, cause the processor to:
      receive voice packets from the PTT server when the presence server indicates that the target user is available to communicate;
      convert the voice packets to text packets when the user preference indicates that the target user prefers to communicate via the IM device;
      transmit the text packets to the IM server; and
      prevent use of the PTT/IM gateway server when the user preference indicates that the target user prefers to communicate via the PTT device.

25. The computer system of claim 24, wherein the PTT server comprises:
instructions to receive voice packets from the PTT device;
instructions to transmit the voice packets to the PTT/IM gateway server; and
instructions to receive voice packets from the PTT/IM gateway server.

26. The computer system of claim 24, wherein the IM server comprises:
instructions to receive text packets from the IM device;
instructions to transmit the text packets to the PTT/IM gateway server; and
instructions to receive text packets from the PTT/IM gateway server.

27. The method of communication of claim 1, further comprising notifying the initiating PTT device that a PTT/IM exchange has begun when the first target user is available to communicate via the target IM device.

28. The method of communication of claim 1, further comprising indicating that the first target user is available to communicate prior to beginning the PTT session with the initiating PTT device and prior to beginning the IM session with a target IM device.

29. The method of communication of claim 1, wherein, when the user preference of the first target user indicates a preference to communicate via the target PTT device, the method further comprises:
receiving a selection of a second target user selected by the initiating user via the initiating PTT device, wherein the second target user is available via a second target IM device;
after beginning the PTT session with the target PTT device, beginning a second IM session with the second target IM device;
receiving voice packets from the initiating PTT device;
sending the voice packets to the target PTT device;
converting the voice packets received from the initiating PTT device into text packets; and
sending the text packets to the second target IM device.

30. The method of communication of claim 1, wherein, when the user preference of the first target user indicates a preference to communicate via the target IM device, the method further comprises:
receiving a selection of a second target user selected by the initiating user via the initiating PTT device, wherein the second target user is available via a second target PTT device;
after beginning the IM session with the target IM device, beginning a second PTT session with the second target PTT device;
receiving voice packets from the initiating PTT device;
sending the voice packets to the second target PTT device;
converting the voice packets received from the initiating PTT device into text packets; and
sending the text packets to the target IM device.

31. The method of communication of claim 1, wherein, when the user preference of the first target user indicates a preference to communicate via the target IM device, the method further comprises:

receiving a selection of a second target user selected by the initiating user via the initiating PTT device, wherein the second target user is available via a second target IM device;

after beginning the IM session with the target IM device, beginning a second IM session with the second target IM device;

receiving voice packets from the initiating PTT device;

converting the voice packets received from the initiating PTT device into text packets; and sending the text packets to the target IM device and to the second target IM device.

32. The method of communication of claim 1, wherein, when the user preference of the first target user indicates a preference to communicate via the target PTT device, the method further comprises:

receiving a selection of a second target user selected by the initiating user via the initiating PTT device, wherein the second target user is available via a second target PTT device;

after beginning the PTT session with the target PTT device, beginning a second PTT session with the second target PTT device;

receiving voice packets from the initiating PTT device;

sending the voice packets to the target PTT device and to the second target PTT device.

33. The method of communication of claim 4, further comprising, when the initiating PTT device is blocked by the target IM device, sending an indication to the initiating PTT device that the initiating PTT device is blocked by the target IM device.

* * * * *